April 1, 1969     S. M. MEITINGER     3,436,447
MANUFACTURE OF REINFORCED PLASTIC SLEEVING AND THE LIKE
Filed April 19, 1966     Sheet 1 of 3

INVENTOR.
SYLVESTER M. MEITINGER
BY
ATTORNEY

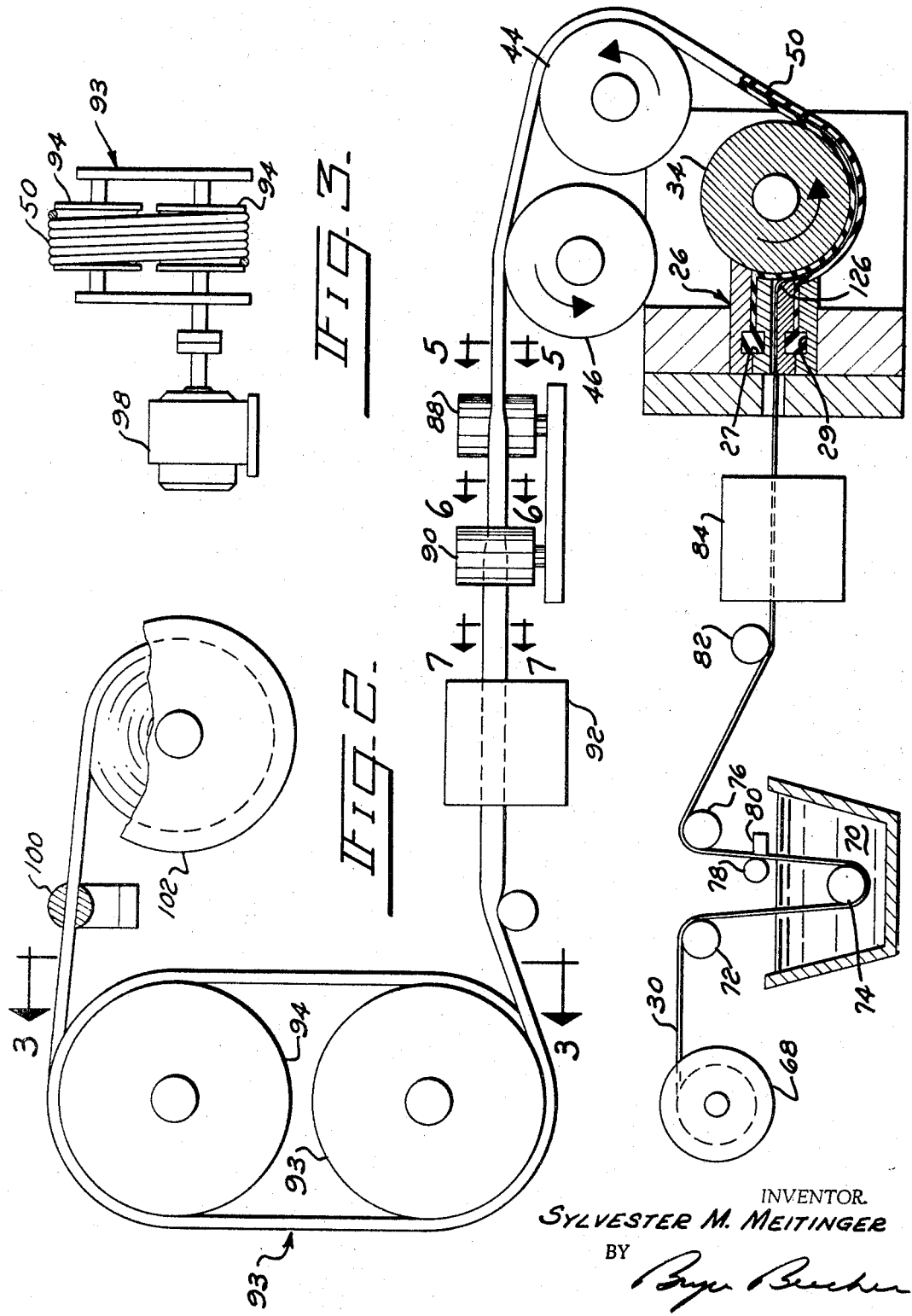

INVENTOR.
SYLVESTER M. MEITINGER
BY
ATTORNEY

United States Patent Office 3,436,447
Patented Apr. 1, 1969

3,436,447
MANUFACTURE OF REINFORCED PLASTIC SLEEVING AND THE LIKE
Sylvester Martin Meitinger, Toledo, Ohio, assignor to Stauffer Chemical Company, New York, N.Y., a corporation of Delaware
Filed Apr. 19, 1966, Ser. No. 543,656
Int. Cl. B29h 9/11; B29d 23/05; B32b 31/30
U.S. Cl. 264—135                        3 Claims

ABSTRACT OF THE DISCLOSURE

Method of making flexible reinforced plastic sleeving characterized in that the plastic is applied to the reinforcement, e.g., braided fiber glass or the like, while the latter is maintained in a flattened tubular form. Prior to the curing of the plastic, the flattened material is restored to a substantially tubular conformation.

---

This invention relates to a method for making flexible, reinforced plastic tubing and embraces a system of apparatus suited for the practice of the method.

Products may be produced by means of the invention for various uses, related and unrelated. Thus, the invention may be applied in the manufacture of sheathing for insulated electric leads and cable, in the manufacture of hose for countless applications and in the fabrication of grips, for instance, as for golf clubs and carts, bicycle handle bars, etc.

Plastics applicable to the invention include both elastomeric substances and substances classified as resins. It is required, in any case, that the plastic be extrudable, with or without the employment of extraneous heat or cooling, and that it be subsequently hardenable to the extent demanded by the particular use in contemplation.

A reinforcing material employed in the practice of the invention must be of such nature as to permit of its being shaped as a tube capable of being flattened and subsequently unflattened without substantial adverse effect on its reinforcing capability.

As a matter of providing a specific example, it may be stated that the invention has been applied with great advantage in the fabrication of sleeving, using silicone rubber as the plastic and tightly knitted or braided fiberglass in tubular form as the reinforcing material. Due to the efficiency of the process herein and the economies afforded thereby, sleeving so manufactured can be employed in areas where the relatively high cost of silicone rubber has previously constituted a stumbling block. As well known, silicone rubber provides many advantages over natural and other synthetic rubbers. These advantages owe, for the most part, to the inertness of silicone rubber with respect to oxidation, its high heat stability, and its unexcelled dielectric properties.

The principal objects of the invention are implicit in the foregoing. Other objects, advantages, and features will become apparent from the further description which will proceed with reference to the accompanying drawings wherein:

FIGURE 2 is a schematic representation of the material flow;

FIGURE 3 is a view on the line 3—3 in FIGURE 2;

Figure 1:
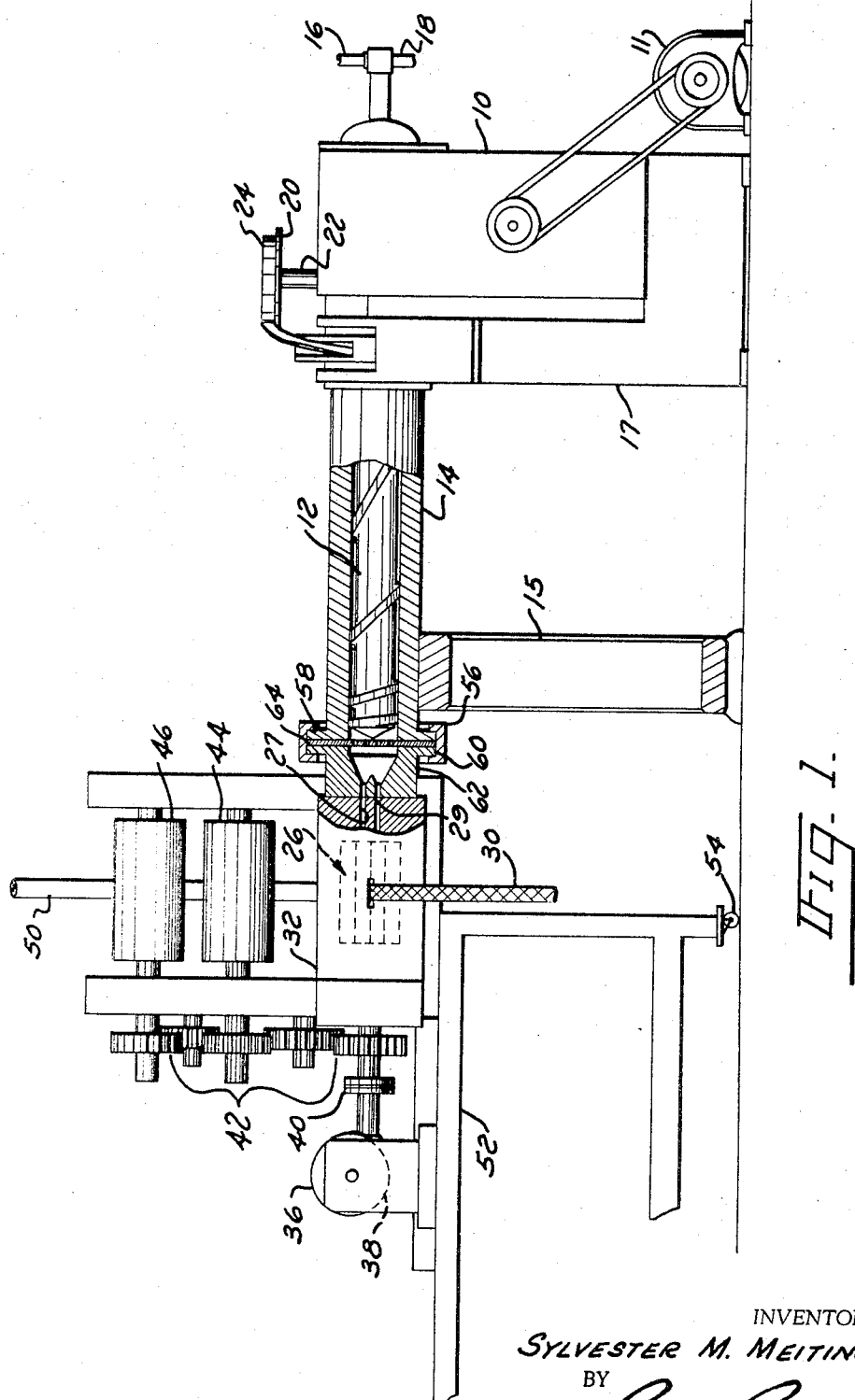
FIGURE 1 is an elevation showing a system of apparatus applicable to the practice of the invention, certain parts being shown in section or broken away.
Figure 4:
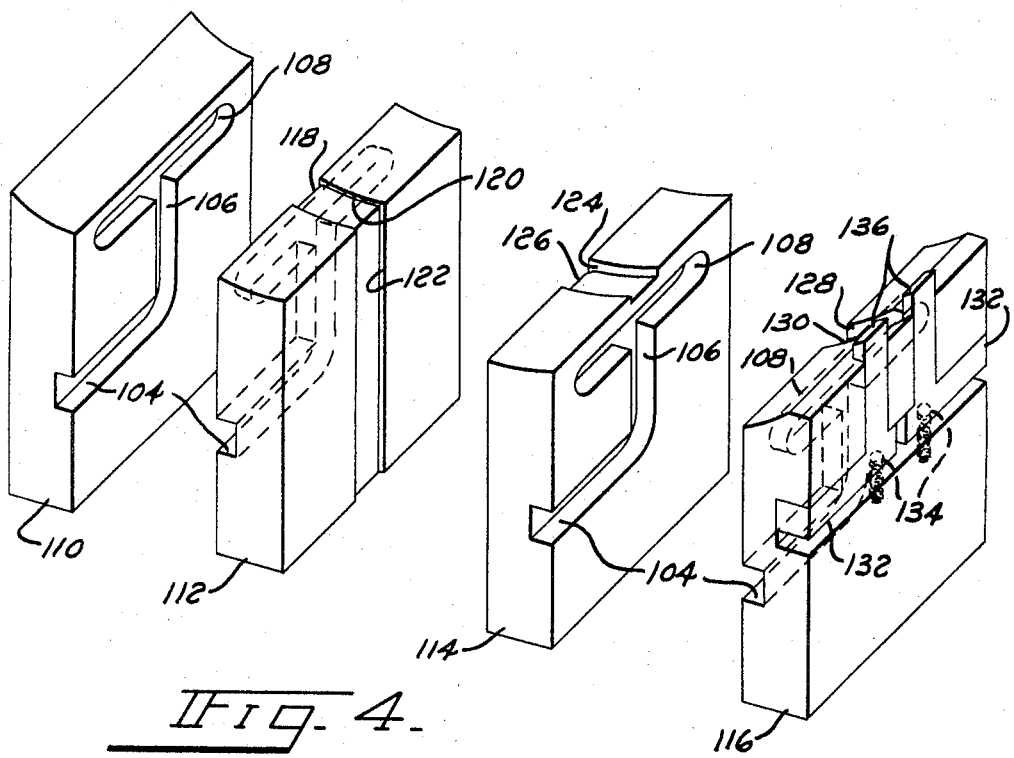
Figure 5:
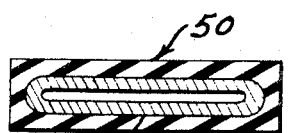
Figure 7:
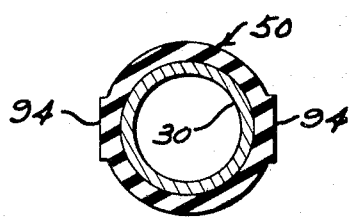
Figure 6:
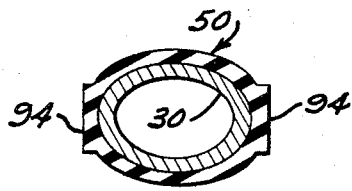

FIGURE 4 affords an exploded perspective view of the several elements making up a die assembly used in the apparatus shown in FIGURE 1; and FIGURES 5, 6, and 7 are sections on the lines indicated in FIGURE 2.

Generally described, the method herein comprises continuously passing the selected reinforcing material in the form of a flattened tube into an extrusion die device, continuously introducing the plastic to be reinforced into such device, continuously withdrawing the extrusion product in flattened tubular form from the device and continuously treating the same to convert it to a substantially unflattened tubular form.

Referring now to FIGURE 1, the numeral 10 denotes a transmission assembly through which an electric motor 11 powers a screw conveyor 12 housed in a cylinder 14. Such cylinder is carried by supports 15 and 17 of which the latter mounts the transmission 10. A conduit 16 allows for the introduction of a heat transfer medium into the body of the conveyor 12, where necessary or desirable. The heat transfer medium is returned to its source via a conduit 18.

A platter 20 turning on spindle 22 carries the plastic material 24 used in the fabrication of the sleeving or other tubular product. As shown, the plastic has the form of a coiled strip which unwinds as the conveyor 12 turns. The rotation of the platter 20 reduces the tension on the strip as it is drawn into the cylinder by the conveyor.

The plastic 24 is forced by the conveyor into an extrusion die assembly 26 which will be later described in detail. It is to be observed that the plastic enters the die assembly in two streams corresponding to passages 27 and 29.

There is also continuously introduced into the die assembly 26, the material 30 applied to reinforce the plastic. Such material is generally of a fibrous nature, as previously suggested, the same being normally knitted or braided into the required tubular form. As it enters the die assembly the tube, if not already flattened, becomes so.

The die assembly has associated therewith within the housing 32 a transfer member shown in FIGURE 2 as a wheel 34. Such member is powered to rotate in a counter-clockwise direction (FIG. 3) by an electric motor 36 through reduction gearing 38 and a coupling 40. A gear train 42 also enables the motor 36 to rotate drums 44 and 46 in such direction. These drums or rollers serve to guide and support the extrusion product 50 as it leaves the apparatus.

Table 52, the legs of which carry casters 54, under-supports all of the parts leftward of the end of the cylinder 14. A ring lock 56 cooperating with flanges 58 and 60, the latter being integral with a header 62, provides a quick disconnect contrivance. An annular seal 64 serves an obvious purpose.

Going now to FIGURE 2 which has been previously referred to in the identification of transfer member 34, it will be seen that the tubular reinforcing material finds its source in a reel 68. From this reel the material is passed through a primer bath 70, idler rollers 72, 74, and 76 being functional in this connection. Mediate rollers 74 and 76 is disposed a stationary roll 78 coacting with a wiper sponge 80 in the removal of excess primer fluid from the tubular material, which leaves roller 76 to pass under still another roller 82. The latter is situate adjacent an oven 84, operating to cure the priming agent.

From oven 84 the tubular reinforcing material enters the die assembly 26, which is constituted of the four elements shown in FIGURE 4. In operation of the assembly, the stream of plastic forced thereinto via passage 27 is applied to the transfer member 34 which deposits such plastic on one face of the flattened tubular reinforcing material. The second stream of plastic, following the route of passage 29, is directly applied to the opposite face of such material.

It is important to observe at this point that the power required to draw the tubular reinforcing material through the priming bath and the oven 84 is supplied through the wheel 34.

The extrusion product 50 as it breaks contact with the wheel 34 is not only completely coated with the plastic but is impregnated therewith to an extent such that the plastic about the inner surface of the tube is flush with the fabric.

Beyond powered rollers 44 and 46 the extrusion product is caused to pass about and between idler rollers 88 and 90 which operate to convert the flattened product to a tubular form. Thereafter, the sleeving is led through an oven 92 wherein the plastic becomes cured. Rollers 88 and 90 should be considered as laterally adjustable.

FIGURES 5, 6, and 7 in the drawings illustrate the progressive conversion of the extruded product to the desired cylindrical section. It should be held in mind that during this operation the plastic is in a soft, readily moldable state.

The ridges 94 seen in FIGURES 6 and 7 result from the nature of the particular die assembly which was designed to provide such ridges, the same being desirable in the particular application contemplated.

The power required for the conveyance of the extrusion product through the roller system 88, 90 and through the oven 92 is supplied by the rollers 34, 44, and 46 in conjunction with a capstan device 93 comprising reels 94 and 96 of which the latter is powered by a variable drive electric motor 98 (FIG. 3). The capstan device keeps the extrusion product centered in the oven 92 and is closely controlled by conventional electrical means to the end that the tubular material is prevented from becoming slack, yet without undue tensioning thereof.

Upon leaving the capstan device 93, the cured product passes through a slot in a conventional level winding device 100 which is powered to reciprocate axially. In this way, the windings are uniformly distributed over the length of the spool of reel 102. Such reel is to be considered as powered, like the capstan, by a variable drive motor governed by known means precluding placement of the section of tubular material between the capstan and the reel under undue tension.

Because of the importance of the die assembly 26, specific description of the elements therein comprised is believed in order.

Each of these elements (110–116) (FIG. 5) has therein a horizontal channel 104 and a vertical channel 106 opening to a groove 108 which is closed at either end. As installed in the apparatus of FIGURE 1, the die elements are tightly bunched to the end that the opposed channels 104 and 106 form a passageway and so that the opposed grooves 108 provide a chamber or reservoir to which the passageways open.

Die element 112 above the groove 108 therein is recessed (118) to provide a slot opening to the reservoir formed by the registering grooves 108 in die elements 110 and 112. Additionally, the top surface of the die element 112 is recessed (120), the width and depth of the recess being determined by the specifications on the particular product being fabricated. The recess 120 communicates with a vertical recess 122, the width and depth of which corresponds to the dimensions of the reinforcing fabric being employed.

It should be noted that the top surfaces of the die elements as bunched together form an arc of a circle having a radius corresponding to that of the transfer wheel 34 (see FIG. 2).

A recess 124 formed in the upper surface of the die element 114 is of the same width but of slightly greater depth than the recess 120. Portion 126 of the recess 124 is to be observed as rounded to avoid any possibility of tearing of the fabric reinforcement (note FIG. 2).

Die element 116 also will be noted as having a recess (128) formed in the upper curved surface thereof. Such recess is of slightly greater width and slightly greater depth than recess 124 and communicates with a recess 130 which provides an opening to the reservoir formed by the registering of the grooves 108 in the die elements 114 and 116.

Die element 116 will be further noted as channeled to accommodate members 132, each of which has associated therewith a spring-loaded ball 134. The sharp edges 136 of such members operate to remove excess plastic and set the width dimension of the extrusion product.

It will be understood that the passage formed by the registering channels 104 of elements 110 and 112 open to passage 27 (FIGS. 1 and 2) and that the passage formed by the registering channels 104 in elements 114 and 116 open to passage 29.

It should be clearly understood that the preceding disclosure is illustrative only and that no limitation is intended to the particular embodiments described. All modifications and arrangements which do not constitute departures from the spirit of the invention are to be taken as embraced thereby.

The invention claimed is:

1. Method of making flexible, reinforced plastic tubing comprising continuously passing the reinforcing material in the form of a flattened tube into an extrusion die device, continuously introducing the plastic to be reinforced into such device, continuously withdrawing the extrusion product in flattened tubular form which such device, the withdrawn product being impregnated with the plastic to an extent such that the plastic about the inner surfaces thereof is substantially flush with the reinforcing material and continuously mechanically treating the impregnated product to convert it to a substantially unflattened tubular form.

2. Method according to claim 1 where said extrusion die device has a transfer member associated therewith and where the plastic is introduced into the said device in two streams, one stream being directly applied to the flattened tube of reinforcing material, the other stream being applied to such material through the medium of said transfer member.

3. Method of making reinforced silicone rubber sleeving comprising passing a flattened tube of lightly knitted or braided fiberglass through a priming solution, removing excess priming solution from said fiberglass material, passing the material with the priming agent thereon through a curing chamber, passing the primed material in flattened tubular form into an extrusion die device having a constantly rotating transfer wheel associated therewith, simultaneously introducing into said device two streams of uncured silicone rubber under pressure, said streams entering said device, one at either side of said flattened tubular material, one stream being directly applied to such material the other being applied thereto through the medium of said transfer wheel, withdrawing the extrusion product in flattened tubular form from said device, the withdrawn product being impregnated with the rubber to an extent such that the rubber about the inner surfaces thereof is substantially flush with the reinforcing material, passing the withdrawn material into contact with mechanical means operating to convert it to a substantially unflattened tubular form and subjecting the reinforced tubular product to a heat treatment serving to cure the silicone rubber.

References Cited

UNITED STATES PATENTS

| | | |
|---|---|---|
| 2,944,285 | 7/1960 | Rhodes. |
| 3,150,217 | 9/1964 | Shanok et al. _____ 264—176 |
| 3,359,357 | 12/1967 | Bentley _____ 264—173 |

ROBERT F. WHITE, Primary Examiner.

G. AUVILLE, Assistant Examiner.

U.S. Cl. X.R.

264—173, 174, 210; 18—13

U.S. DEPARTMENT OF COMMERCE
PATENT OFFICE
Washington, D.C. 20231

UNITED STATES PATENT OFFICE
CERTIFICATE OF CORRECTION

Patent No. 3,436,447                                              April 1, 19

Sylvester Martin Meitinger

It is certified that error appears in the above identified patent and that said Letters Patent are hereby corrected as shown below:

Column 4, line 26, "which" should read -- from --.

Signed and sealed this 7th day of April 1970.

(SEAL)
Attest:

Edward M. Fletcher, Jr.                                    WILLIAM E. SCHUYLER,
Attesting Officer                                                      Commissioner of Pate